United States Patent
Kondo et al.

(10) Patent No.: US 10,557,444 B2
(45) Date of Patent: Feb. 11, 2020

(54) HIGH-PRESSURE FUEL INJECTION PIPE WITH CONNECTION HEAD AND METHOD OF MOLDING CONNECTION HEAD

(71) Applicant: USUI CO., LTD., Shimizu-cho, Sunto-gun, Shizuoka (JP)

(72) Inventors: Hiroaki Kondo, Shimizu-cho (JP); Akio Tagami, Shimizu-cho (JP)

(73) Assignee: USUI CO., LTD. (JP)

( * ) Notice: Subject to any disclaimer, the term of this patent is extended or adjusted under 35 U.S.C. 154(b) by 0 days.

(21) Appl. No.: 15/780,278

(22) PCT Filed: Nov. 28, 2016

(86) PCT No.: PCT/JP2016/085208
§ 371 (c)(1),
(2) Date: May 31, 2018

(87) PCT Pub. No.: WO2017/094671
PCT Pub. Date: Jun. 8, 2017

(65) Prior Publication Data
US 2018/0355829 A1    Dec. 13, 2018

(30) Foreign Application Priority Data

Dec. 4, 2015 (JP) ................................. 2015-237556

(51) Int. Cl.
*F02M 55/02* (2006.01)
*F02M 35/10* (2006.01)
(Continued)

(52) U.S. Cl.
CPC .... *F02M 55/025* (2013.01); *F02M 35/10216* (2013.01); *F02M 55/005* (2013.01);
(Continued)

(58) Field of Classification Search
CPC .. F02M 55/025; F02M 55/004; F02M 55/005; F02M 35/10216; F16L 19/0286
See application file for complete search history.

(56) References Cited

U.S. PATENT DOCUMENTS

2005/0127665 A1    6/2005 Usui et al.
2009/0139595 A1*   6/2009 Kato ................... F02M 55/005
                                                          138/109
(Continued)

FOREIGN PATENT DOCUMENTS

JP    2004-36441      2/2004
JP    2005-201254     7/2005
(Continued)

OTHER PUBLICATIONS

International Search Report dated Jan. 10, 2017.

*Primary Examiner* — Jacob M Amick
(74) *Attorney, Agent, or Firm* — Gerald E. Hespos; Michael J. Porco; Matthew T. Hespos

(57) ABSTRACT

Provided is a high-pressure fuel injection pipe with a connection head which achieves an improvement in outer-surface cleanliness and prevention of a decrease in axial force and fastening strength. The pipe having, at a connection end of a narrow-diameter thick-wall steel pipe having a rust-inhibiting coating applied to an outer surface of the pipe, the connection head composed of a spherically-shaped seat surface, an annular flange, and a conical surface and having an outside peripheral surface forming formed into seat surface in a truncated conical shape or truncated arc shape for a mating seat; and a washer fitting in a neck lower part of the connection head and having a rust-inhibiting coating applied to an outer surface of the washer, wherein a contact part between the neck lower part of the connection (Continued)

head and an end part of the washer has a metal-to-metal contact structure without having the rust-inhibiting coating.

2 Claims, 4 Drawing Sheets

(51) Int. Cl.
    *F02M 55/00*     (2006.01)
    *F16L 19/028*     (2006.01)

(52) U.S. Cl.
    CPC ......... *F02M 55/02* (2013.01); *F16L 19/0286* (2013.01); *F02M 2200/04* (2013.01); *F02M 2200/05* (2013.01)

(56) References Cited

U.S. PATENT DOCUMENTS

| | | | |
|---|---|---|---|
| 2011/0121563 A1* | 5/2011 | Toyoshima | F02M 55/005 285/263 |
| 2016/0230725 A1* | 8/2016 | Katsumata | F02M 55/02 |

FOREIGN PATENT DOCUMENTS

| | | |
|---|---|---|
| JP | 2008-133817 | 6/2008 |
| JP | 2009-275278 | 11/2009 |
| JP | 4636515 | 12/2010 |
| JP | 5455303 | 1/2014 |

* cited by examiner

HIGH-PRESSURE FUEL INJECTION PIPE WITH CONNECTION HEAD AND METHOD OF MOLDING CONNECTION HEAD

BACKGROUND

Field of the Invention

The present invention relates to a high-pressure fuel injection pipe with a connection head disposed and often used as, for example, a supply path for fuel in a diesel internal combustion engine and made of thick-wall steel of a relatively thin diameter with a pipe diameter on the order of 4 mm to 20 mm and a wall thickness on the order of 1 mm to 8 mm, and a method of molding the connection head.

Description of the Related Art

Conventionally, as a high-pressure fuel injection pipe with a connection head of such a type, one with a washer (connection washer) fitting in a neck lower part of a connection head has been known, as exemplarily depicted in FIG. 6 (refer to Japanese Patent No. 4636515 and Japanese Patent No. 5455303. This washer-equipped high-pressure fuel injection pipe is configured of a connection head 12A formed at a connection end of a thick-wall narrow-diameter steel pipe 11 and having an outside peripheral surface formed of a spherically-shaped seat surface 13A, an annular flange 15A provided so as to be spaced from the seat surface 13A in a pipe axial direction, and a conical surface 14A contiguous to the seat surface 13A and tapered to the annular flange 15A toward a tip; and a washer (connection washer) 16A fitting in the neck lower part of the connection head 12A. Here, used as the thick-wall steel pipe 11 is one made of a relatively narrow-diameter, thick-wall pipe made of a steel material such as stain-less steel, TRIP steel, high-pressure-pipe carbon steel, or alloy steel cut into a fixed length in advance, having a pipe diameter on the order of 4 mm to 20 mm and a wall thickness t on the order of 1 mm to 8 mm, and having an outer surface given in advance a rust-inhibiting coating 11-1 such as a zinc-plated layer for rust inhibition. Furthermore, used as the washer (connection washer) 16A is one having an outer surface given a rust-inhibiting coating 16A-1 such as a zinc-plated layer similar to the above. Also, used as a washer (connection washer) 16A-2 is one having not only an outer surface but also an inner surface given the rust-inhibiting coating 16A-1 such as a zinc-plated layer similar to the above.

As a method of molding a head of the washer-equipped high-pressure fuel injection pipe, for example, as depicted in FIG. 7, in a state in which the washer 16A given the rust-inhibiting coating 16A-1 such as a zinc-plated layer similar to that steel pipe externally fits in advance, with a head-process margin, near a connection head of the thick-wall steel pipe 11 having an outer surface given a rust-inhibiting coating 11-1 such as a zinc-plated layer for rust inhibition, the thick-wall steel pipe 1 is clamped by a chuck 17. In that state, when a tip of that steel pipe 11 is pressured (pressed) by a punch member 18 to the pipe axial direction, a portion of the head-process margin of the thick-wall steel pipe 11 plastically flows to mold the connection head 12A. Simultaneously, the washer 16A covers the outer peripheral surface of the neck lower part of the connection head 12A. At the tip of the thick-wall steel pipe 11, a washer-equipped high-pressure injection pipe is obtained, with an outside peripheral surface configured of the spherically-shaped seat surface 13A for a mating seat, the annular flange 15A provided so as to be spaced from that seat surface 13A in the pipe axial direction, and the conical surface 14A contiguous to the seat surface 13A and tapered to the annular flange 15A toward a tip.

In recent years, with a common rail system in a diesel internal combustion engine having higher pressure, clearance of an injection port and an operating part of an injector has become stricter, and a situation has become such that outer-surface cleanliness of a terminal in a high-pressure fuel injection pipe for diesel internal combustion engines is demanded. Thus, in the above-described conventional method of molding the head of the high-pressure fuel injection pipe, due to an increase in material hardness (strength), molding load, and so forth with higher pressure, protrusion due to exfoliation of the rust-inhibiting coatings 11-1 and 16A-1 such as zinc-plated layers at a connection part between the neck lower part of the connection head and an end part of the washer becomes significant, which poses a problem of serving as one cause for inhibiting the demand for outer-surface cleanliness and also a cause for a decrease in the axial force due to exfoliation and removal of this rust-inhibiting coating such as a zinc-plated layer and a decrease in tightening strength of a fastening nut due to creep (slip).

An object of the present invention is to provide a high-pressure fuel injection pipe with a connection head and a method of molding the head which eliminates the problem the conventional art has, that is, protrusion due to exfoliation of a zinc-plated layer at a contact part between a neck lower part of a connection head and an end part of a washer occurring at the time of molding, and aims at an improvement in outer-surface cleanliness and prevention of a decrease in axial force and fastening strength.

SUMMARY

A high-pressure fuel injection pipe with a connection head according to the present invention has: at a connection end of a narrow-diameter thick-wall steel pipe having a rust-inhibiting coating applied to an outer surface of the steel pipe, the connection head composed of a spherically-shaped seat surface, an annular flange formed to be spaced from the seat surface in the pipe axial direction, and a conical surface contiguous to the seat surface and tapered from the annular flange toward a tip, and having an outside peripheral surface formed into the seat surface in a truncated conical shape or truncated arc shape for a mating seat; and a washer fitting in a neck lower part of the connection head and having a rust-inhibiting coating applied to an outer surface of the washer, wherein a contact part between the neck lower part of the connection head and an end part of the washer has a metal-to-metal contact structure without having the rust-inhibiting coating.

Also, a method of molding the connection head of a high-pressure fuel injection pipe according to the present invention includes: externally fitting a washer having a rust-inhibiting coating applied to an outer surface of the washer near to a connection end of a narrow-diameter thick-wall steel pipe which is cut into a fixed length in advance and has a rust-inhibiting coating applied to an outer surface of the steel pipe; clamping, by a chuck, the washer and the steel pipe with a head-process margin for connection at the tip side of the steel pipe from the washer; then performing a head process by pressing a tip of the steel pipe by a punch member provided with a head mold coaxially from outside to process an outside peripheral surface of the connection head to form a seat surface into a truncated conical shape or truncated arc shape for a mating seat to mold a connection head and to mold an outer peripheral surface of a neck lower part of the connection head so as to be covered by the washer, wherein the head process is performed with a part of the rust-inhibiting coating at the area corresponding to the neck lower part of the connection head of the narrow-diameter thick-wall steel pipe and a part of the rust-inhibiting coating at an end part of the washer which contacts with the neck lower part of the connection head each exfoliated and removed in advance, and a contact part between the neck lower part of the connection head and the end part of the washer are molded so as to have a metal-to-metal contact structure.

The high-pressure fuel injection pipe of the present invention achieves an excellent effect as follows. A part of the rust-inhibiting coating at the area corresponding to the neck lower part of the connection head of the narrow-diameter thick-wall steel pipe and a part of the rust-inhibiting coating at the end part of the washer in contact with the outer peripheral surface of the neck lower part of the connection head are each eliminated, and the contact part between the outer peripheral surface of the neck lower part of that connection head and the end part of the washer has a metal-to-metal contact structure, thereby a decrease in outer-surface cleanliness is prevented, and high outer-surface cleanliness can be ensured. Also, it is possible to prevent a decrease in the axial force due to exfoliation and removal of the rust-inhibiting coating and a decrease in tightening strength of a fastening nut due to creep (slip).

Also, according to the method of molding the head of the present invention, an excellent effect is achieved as follows. A head process is performed in a state in which a part of the rust-inhibiting coating at the area corresponding to the neck lower part of the connection head of the narrow-diameter thick-wall steel pipe and a part of the rust-inhibiting coating at the end part of the washer in contact with the neck lower part of the connection head are each exfoliated and removed in advance, thereby no rust-inhibiting coating is pushed by pressuring force at the time of molding the connection head, protrusion of those rust-inhibiting coatings can be completely eliminated, and thus a decrease in the axial force due to exfoliation and removal of the rust-inhibiting coating and a decrease in tightening strength of the fastening nut due to creep (slip) are prevented. Thus, it is possible to easily manufacture a high-pressure fuel injection pipe having a connection head with an existing facility.

DETAILED DESCRIPTION

A thick-wall steel pipe 1 used in the present invention is made of a relatively narrow-diameter, thick-wall pipe made of a steel material such as stain-less steel, TRIP steel, high-pressure-pipe carbon steel, or alloy steel cut into a fixed length in advance, having a pipe diameter on the order of 4 mm to 20 mm and a wall thickness t on the order of 1 mm to 8 mm, and having an outer surface given a rust-inhibiting coating 1-2 such as a zinc-plated layer for rust inhibition, as described above. Furthermore, a washer (connection washer) 6A used in the invention has an outer surface given a rust-inhibiting coating 6A-2 such as a zinc-plated layer similar to the above.

Figure 1:
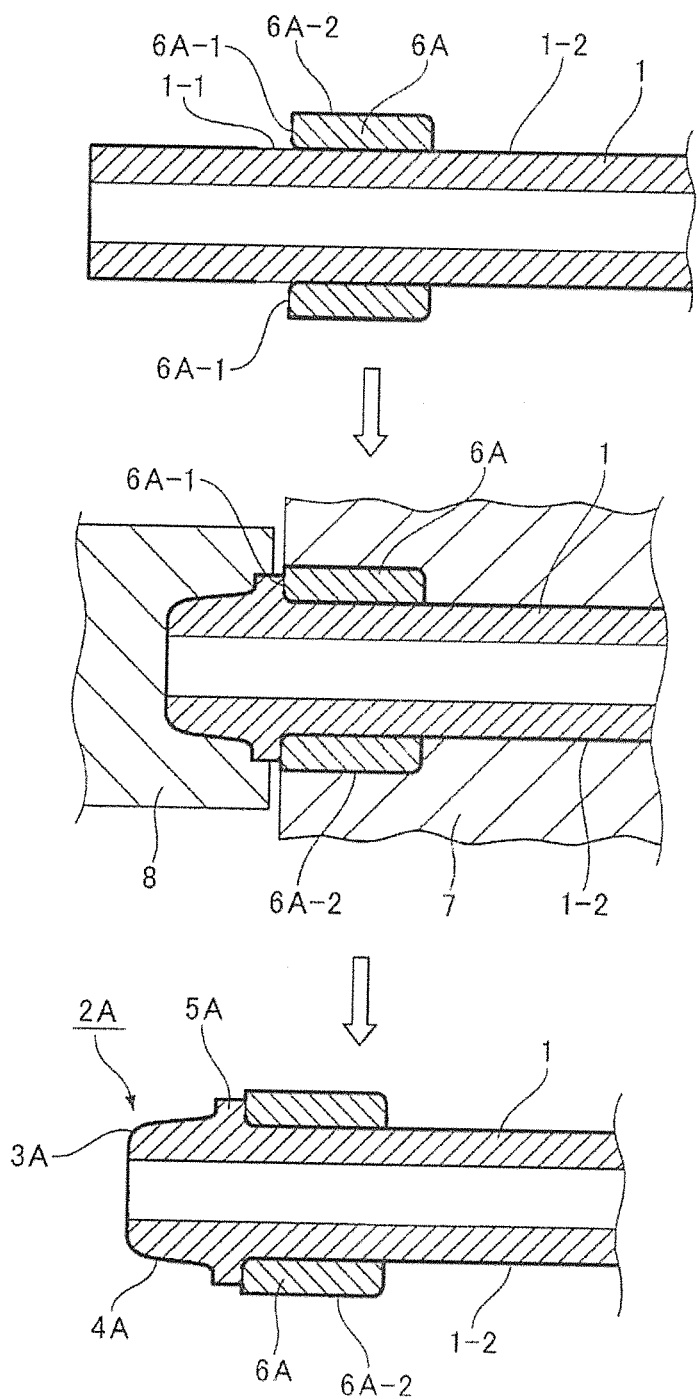
FIG. 1 is a descriptive diagram with longitudinal cross sections depicting one embodiment of a process step according to a high-pressure fuel injection pipe with connection head and a method of molding the connection head of the present invention.
Figure 2:
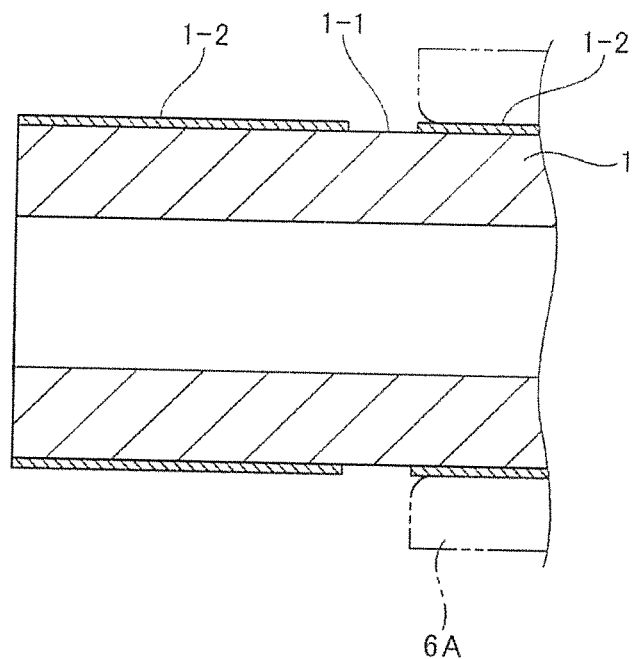
FIG. 2 is an enlarged longitudinal sectional view depicting a portion corresponding to the connection head of the high-pressure fuel injection before molding of the connection head according to the method of molding the connection head depicted in FIG. 1.
Figure 3:
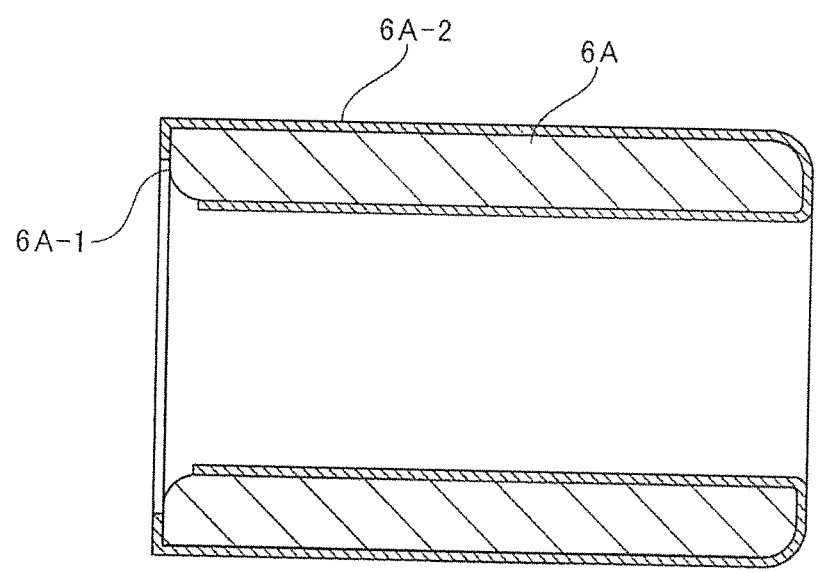
FIG. 3 is an enlarged longitudinal sectional view depicting a washer before molding of the connection head according to the method of molding the connection head depicted in FIG. 1.

In the method of molding a connection head of a high-pressure fuel injection pipe depicted in FIG. 1, the washer 6A externally fits in advance near the connection head of the thick-wall steel pipe 1 with a head-process margin. The thick-wall steel pipe 1 has a steel-base material section 1-1 where the rust-inhibiting coating 1-2 applied at an area corresponding to a neck lower part of the connection head is exfoliated and removed in advance as depicted in FIG. 2. Also, the washer 6A has a steel-base material section 6A-1 where the rust-inhibiting coating 6A-2 applied at an end part of the washer in contact with the outer peripheral surface of the neck lower part of the connection head is exfoliated and removed in advance as depicted in FIG. 3.

Figure 4:
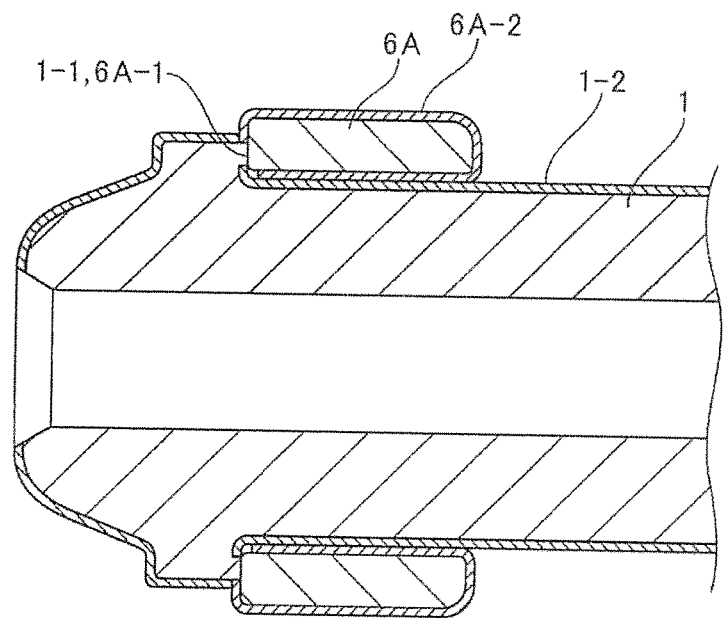
FIG. 4 is an enlarged longitudinal sectional view depicting the connection head of the high-pressure fuel injection pipe molded by the method of molding the connection head depicted in FIG. 1.

Subsequently, in the above state, with the washer 6A and the thick-wall steel pipe 1 clamped by a chuck 7, a tip of the steel pipe is pressured (pressed) by a punch member 8 to the pipe axial direction and then a portion of the head-process margin of the thick-wall steel pipe 1 plastically flows to mold a connection head 2A. Simultaneously, the washer 6A covers the outer peripheral surface of the neck lower part of the connection head 2A, thereby obtaining a washer-equipped high-pressure fuel injection pipe in which at the tip of the thick-wall steel pipe 1, an outside peripheral surface is configured of a spherically-shaped seat surface 3A for a mating seat, an annular flange 5A provided so as to be spaced from that seat surface 3A in the pipe axial direction, and a conical surface 4A contiguous to the seat surface 3A and tapered from the annular flange 5A toward the tip, and a contact part between the neck lower part of the connection head 2A and an end part of the washer has a metal-to-metal contact structure without having the rust-inhibiting coatings 1-2 and 6A-2 (FIG. 4).

Regarding an exfoliation and removal range of the rust-inhibiting coating 6A-2 of the washer 6A, although it is not particularly limited, the coating is desired to be removed with a diameter slightly larger than the outer diameter of the annular flange 5A. That is, the reason for this is that protrusion of the rust-inhibiting coating 6A-2 occurs at the time of pressuring by the punch member 8 in the pipe axial direction if the removal range of the rust-inhibiting coating 6A-2 is small and, on the other hand, the outer appearance is impaired if the removal range is too large.

In the connection head of the high-pressure fuel injection pipe of the present invention, as described above, a part of the rust-inhibiting coating 1-2 at the area corresponding to the neck lower part of the connection head 2A of the narrow-diameter thick-wall steel pipe 1 and a part of the rust-inhibiting coating 6A-2 at the end part of the washer 6A in contact with the outer peripheral surface of the neck lower part of the connection head 2A are each eliminated, and the contact part between the outer peripheral surface of the neck lower part of the connection head and the end part of the washer 6A has a metal-to-metal contact structure. Thus, a decrease in outer-surface cleanliness due to the rust-inhibiting coatings 1-2 and 6A-2 is prevented, and high outer-surface cleanliness can be ensured. Also, it is possible to prevent a decrease in the axial force due to exfoliation and removal of the rust-inhibiting coating and a decrease in tightening strength of a fastening nut due to creep (slip).

Figure 5:
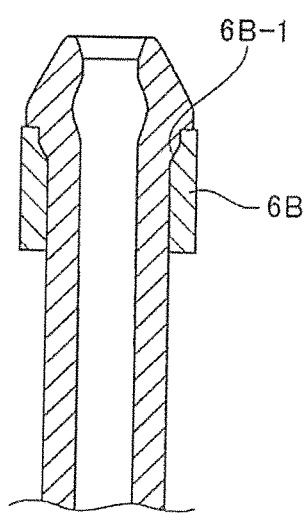
FIG. 5 is a longitudinal sectional view depicting examples of the connection head of the high-pressure fuel injection pipe using washers in different sectional shapes.
Figure 5:
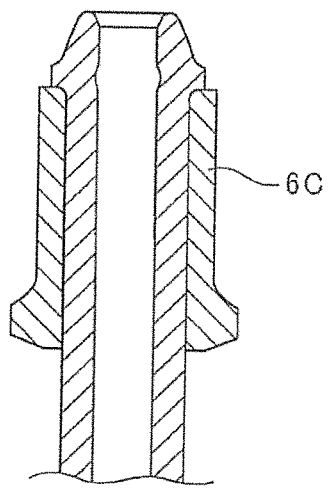
Figure 6:
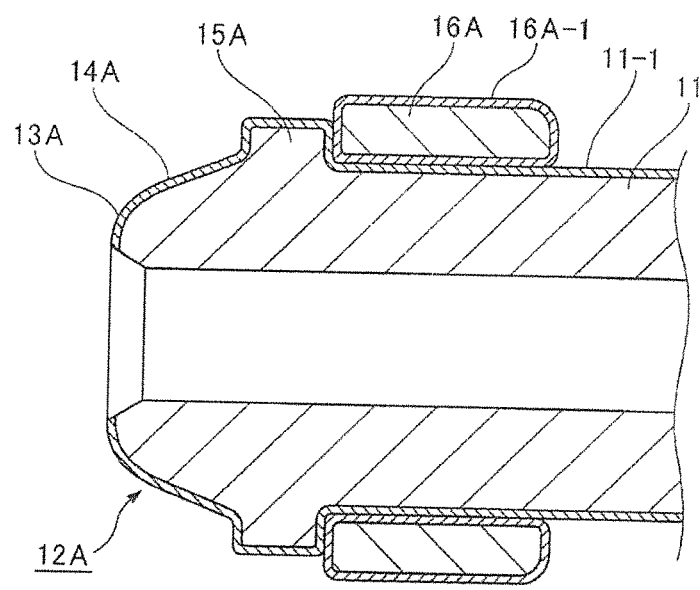
FIG. 6 is a longitudinal sectional view depicting one example of a conventional high-pressure fuel injection pipe with a connection head.
Figure 7:
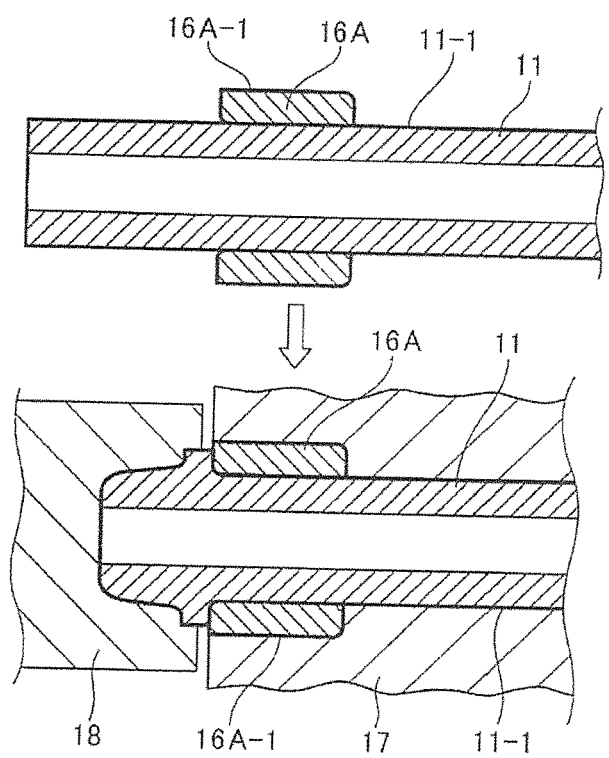
FIG. 7 is a descriptive diagram with longitudinal cross sections depicting one example of a conventional method of molding a connection head of a high-pressure fuel injection pipe with the connection head.

Also, according to the method of molding the connection head of the present invention, a head process is performed in a state in which a part of the rust-inhibiting coating 1-2 at the area corresponding to the neck lower part of the connection head 2A of the narrow-diameter thick-wall steel pipe 1 and a part of the rust-inhibiting coating 6A-2 at the washer end part 6A in contact with the neck lower part of the connection head are each exfoliated and removed in advance. Thus, protrusion of the rust-inhibiting coating 1-2 of the neck lower part and the rust-inhibiting coating 6A-2 of the washer end part 6A in contact with the neck lower part of the connection head pushed by pressuring force at the time of molding the connection head is completely eliminated, and prevention of a decrease in the axial force due to exfoliation and removal of the rust-inhibiting coating and a decrease in tightening strength of the fastening nut due to creep (slip) are aimed at. Thus, it is possible to easily manufacture a high-pressure fuel injection pipe having a connection head with an existing facility, Note that while the connection head using a cylindrically-shaped cylinder body as a washer is described as an example in the embodiment depicted in FIG. 1 to FIG. 4, it goes without saying that the embodiment can be applied also to a high-pressure fuel injection pipe using, for example, a washer 6B having a step-equipped diameter-enlarged part 6B-1 on the inner periphery of the inside of the cylindrically-shaped cylinder body as depicted in (a) of FIG. 5 or a sleeve washer 6C as depicted in (b) of FIG. 5. Also, the rust-inhibiting coating 1-2 on the outer surface of the connection head 2A of the high-pressure fuel injection pipe in the embodiment depicted in FIG. 1 to FIG. 4 is not necessarily required and may be omitted. In that case, a head process is performed with the rust-inhibiting coating 1-2 at the area corresponding to the connection head 2A exfoliated and removed in advance.

REFERENCE SIGNS LIST 1 thick-wall steel pipe
1-1, 6A-1 steel-base material section
1-2, 6A-2 rust-inhibiting coating
2A connection head
3A seat surface
4A conical surface
5A annular flange
6A washer

The invention claimed is:

1. A high-pressure fuel injection pipe with a connection head, comprising:
the connection head at a connection end of a narrow-diameter thick-wall steel pipe having a rust-inhibiting coating applied to an outer surface thereof, the connection head being composed of a spherically-shaped seat surface, an annular flange formed to be spaced from the seat surface in a pipe axial direction, and a conical surface contiguous to the seat surface and tapered from the annular flange toward a tip, the connection head having an outside peripheral surface formed into the seat surface in a truncated conical shape or truncated arc shape for a mating seat; and
a washer fitting in a neck lower part of the connection head and having a rust-inhibiting coating applied to an outer surface of the washer,
wherein a contact part between the neck lower part of the connection head and an end part of the washer has a metal-to-metal contact structure without having the rust-inhibiting coating.

2. A method of molding a connection head of a high-pressure fuel injection pipe having the connection head, comprising:
externally fitting a washer having a rust-inhibiting coating applied to an outer surface of the washer near to a connection end of a narrow-diameter thick-wall steel pipe that is cut into a fixed length in advance and has a rust-inhibiting coating applied to an outer surface of the narrow-diameter thick-wall steel pipe,
clamping, by a chuck, the washer and the narrow-diameter thick-wall steel pipe with a head-process margin for connection at a tip side of the narrow-diameter thick-wall steel pipe from the washer, then
performing a head process by pressing a tip of the narrow-diameter thick-wall steel pipe by a punch member provided with a head mold coaxially from outside to process the tip so as to be composed of a spherically-shaped seat surface, an annular flange formed to be spaced from the seat surface in a pipe axial direction, and a conical surface contiguous to the seat surface and tapered from the annular flange toward a tip and so as to have its outside peripheral surface formed into a seat surface in a truncated conical shape or truncated arc shape for a mating seat thereby to mold the connection head and to mold an outer peripheral surface of a neck lower part of the connection head to be covered by the washer,
wherein the head process is performed with a part of the rust-inhibiting coating at an area corresponding to the neck lower part of the connection head of the narrow-diameter thick-wall steel pipe and a part of the rust-inhibiting coating at an end part of the washer which contacts with the neck lower part of the connection head each exfoliated and removed in advance, and a contact part between the neck lower part of the connection head and the end part of the washer are molded to have a metal-to-metal contact structure.

* * * * *